(12) United States Patent
Simpson et al.

(10) Patent No.: US 7,556,158 B2
(45) Date of Patent: Jul. 7, 2009

(54) DRAINAGE MANAGEMENT SYSTEMS AND METHODS

(75) Inventors: Timothy S. Simpson, San Juan Capistrano, CA (US); Gregory Coppola, Dana Point, CA (US); Ron Borrego, Denver, CO (US)

(73) Assignee: Geomatrix Consultants, Inc., Newport Beach, CA (US)

(*) Notice: Subject to any disclaimer, the term of this patent is extended or adjusted under 35 U.S.C. 154(b) by 0 days.

(21) Appl. No.: 11/675,360

(22) Filed: Feb. 15, 2007

(65) Prior Publication Data
US 2007/0134066 A1 Jun. 14, 2007

Related U.S. Application Data

(62) Division of application No. 10/692,507, filed on Oct. 24, 2003.

(51) Int. Cl.
*B01D 17/02* (2006.01)
(52) U.S. Cl. .................................................. 210/538
(58) Field of Classification Search .............. 210/802, 210/521, 522, 305, 320, 538, 540, 532.1
See application file for complete search history.

(56) References Cited

U.S. PATENT DOCUMENTS 2,570,304 A * 10/1951 Bach .......................... 210/802

| | | |
|---|---|---|
| 2,671,057 A | 3/1954 | McClure |
| 3,666,108 A | 5/1972 | In't Veid |
| 4,201,695 A | 5/1980 | Juntgen et al. |
| 5,215,017 A | 6/1993 | Tang |
| 5,647,977 A | 7/1997 | Arnaud |
| 5,800,715 A | 9/1998 | Batson |
| 5,840,198 A | 11/1998 | Clarke |
| 6,313,545 B1 | 11/2001 | Finley et al. |

FOREIGN PATENT DOCUMENTS

DE    3305344 A1    9/1984

OTHER PUBLICATIONS

Fundamentals of Fluid Mechanics, Bruce Munson et al., 1990 pp. 127-129.*

* cited by examiner

*Primary Examiner*—Sunil Singh
(74) *Attorney, Agent, or Firm*—Hani Z. Sayed; Rutan & Tucker, LLP

(57) ABSTRACT

A flow limiting inlet structure is designed to collect water or other fluids in a pool above grade, and to provide improved capture of sediments and surface pollutants such as oils and greases in the pool, while regulating the flow of water or other fluids during discharge into an outlet pipe. In a conventional storm water detention basin a vertical cylindrical discharge structure can be used to regulate the basin water depth and discharge flow rate of storm water out of the detention basin, in conjunction with the use of a specially designed baffle system that prevents the release of any greases or oils floating on the water surface while capturing any floating trash or debris.

2 Claims, 4 Drawing Sheets

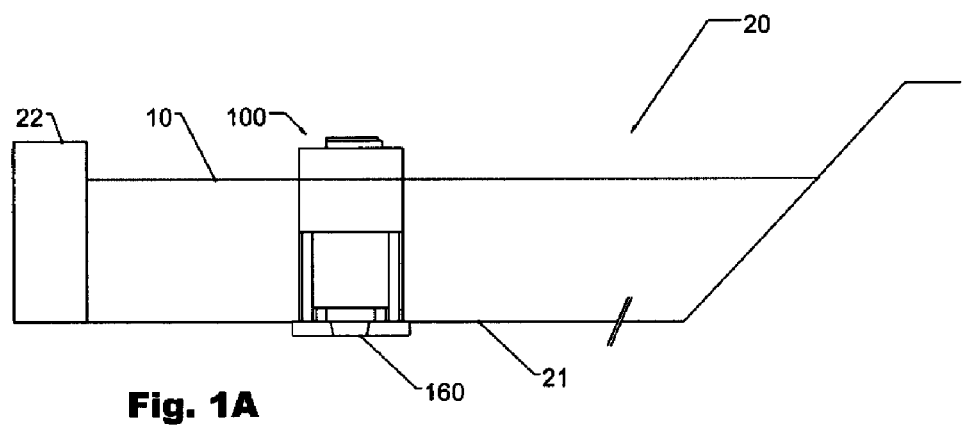
Fig. 1A
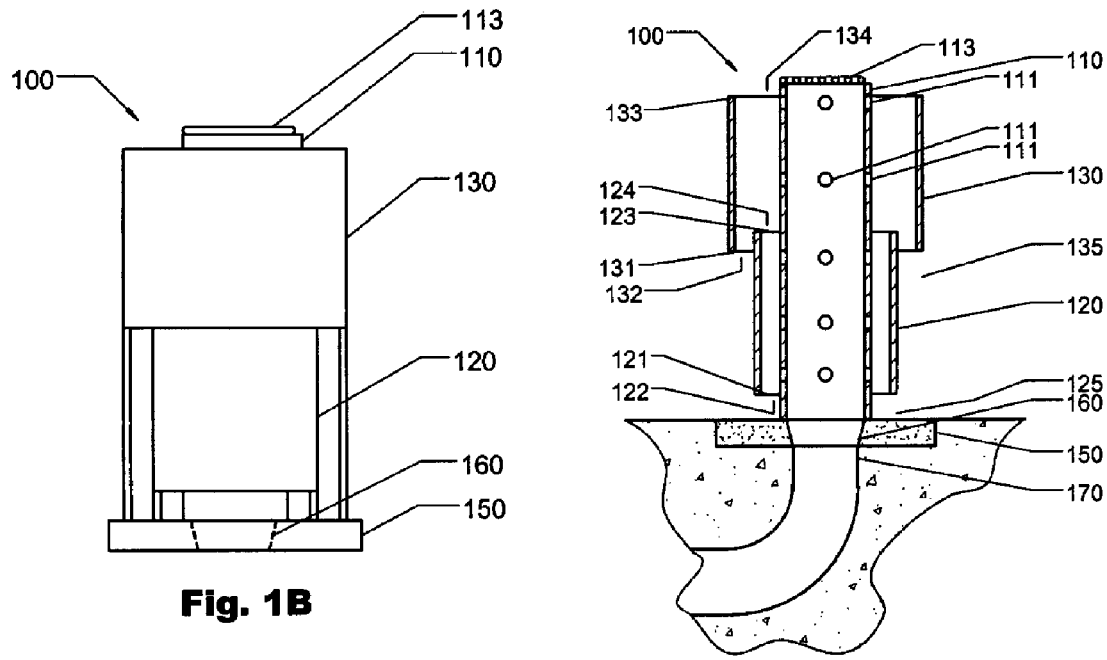
Fig. 1B
Fig. 1C
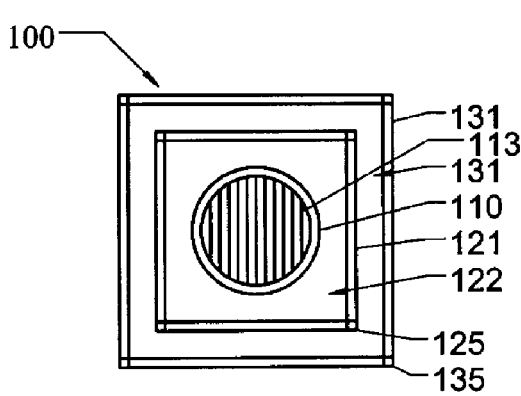
Fig. 1D

DRAINAGE MANAGEMENT SYSTEMS AND METHODS

This application is a divisional of pending U.S. application Ser. No. 10/692507, filed on Oct. 24, 2003, which is hereby incorporated by reference in its entirety.

FIELD OF THE INVENTION

The field of the invention is drainage management systems, more particularly, flow limiting inlet structures designed to collect water or other fluids in a pool above grade and to regulate water discharge, enabling the system to capture sediments and surface pollutants such as oil and grease in the pool before allowing the collected water to discharge into an outlet pipe.

BACKGROUND OF THE INVENTION

Contaminated sediments, greases, and oils, and other pollutants collect on the ground during dry periods when little or no rainfall occurs. When a storm occurs after such a dry period, the accumulated pollutants are mobilized by storm water and get flushed into surface water drainage systems. The flushing of pollutants into such drainage systems is generally undesirable, particularly if the water or other fluids flowing through such drainage systems remain untreated before being discharged into a river, lake, or ocean. The occurrence of a storm after a dry period and the corresponding flushing of pollutants into drainage systems is often referred to as a "first flush" event. First flush events are particularly troublesome in industrial areas due to the types and amounts of pollutants that accumulate.

Because the effects of first flush events are undesirable, efforts have been made to limit such effects. A common way to do so is to allow storm waters to initially flow into a detention basin and to use a flow limiting structure to control flow out of the detention basin. Such flow limiting structures include, among others, risers, trash racks, filters, and weirs. Such structures typically try to allow sediments to settle out, prevent the outflow of surface contaminants, or prevent the outflow of larger sized pollutants.

A concern in designing such flow limiting structures is that they should not allow flooding to occur, even if preventing flooding allows pollutants to escape. As a result, flow-limiting structures are typically designed to provide for "overflow" situations during which quantities of water in excess of the design first-flush storm are allowed to flow through the structure untreated if the incoming water volume exceeds the capacity of the system. In an attempt to help prevent overflow from occurring, some structures such as perforated risers are designed to permit a higher flow rate through an outlet as water levels rise.

Unfortunately, previously known flow-limiting structures do not always provide a solution that adequately balances the design goals of preventing flooding, allowing sediments to settle, preventing flushing of surface pollutants, and limiting peak discharge flow rates. As such, there is a need for new flow limiting structures such as are disclosed herein.

SUMMARY OF THE INVENTION

The present invention is directed to a flow limiting inlet structure designed to collect water or other fluids in a pool above grade, and to provide improved capture of sediments and surface pollutants such as oils and greases in the pool, while regulating the flow of water or other fluids during discharge into an outlet pipe. More particularly, the present invention is directed to the use of a conventional storm water detention basin, and the use of a vertical cylindrical discharge structure to regulate the basin water depth and discharge flow rate of storm water out of the detention basin, in conjunction with a specially designed baffle system that prevents the release of any greases or oils floating on the water surface while capturing any floating trash or debris.

If a perforated discharge structure is used, the location and diameter of holes in the discharge structure can be varied to produce a wide variety of discharge flow rates so as to control the approach velocity of incoming storm water and promote complete settlement of suspended sediments. This system attenuates the peak storm water inflow rate and reduces the peak discharge flow rate as needed. Flow in excess of "first flush" volumes pass through the system untreated by entering the top of the discharge structure while concurrently flowing over a basin perimeter weir set at the same elevation. These larger storm volumes are not completely attenuated nor treated by the detention basin.

After a storm has passed, site staff can shovel out the collected sediment from the detention basin, washout all of the accumulated grease and oil, and in so doing make the system ready for the next storm event.

It is contemplated that the methods and systems disclosed herein are particularly well adapted for use in managing the quality of storm waters draining from industrial sites. However, it is also contemplated that the methods and systems disclosed herein will prove advantageous in other drainage and/or fluid control applications.

In one embodiment, the present invention comprises a storm water detention basin comprising a basin sized and positioned to accumulate storm water, an outlet, and a flow limiting structure impeding flow of water out of the basin through the outlet, the flow limiting inlet structure comprising: a set of one or more baffles adapted to hinder the flow of surface contaminants into the outlet; and a discharge riser adapted to control the discharge flow rate out of the basin to effectively capture sediment in the basin. In some such embodiments the set of one or more baffles are a tiered set of nested baffles wherein each baffle that is nested within another baffle is positioned at a lower height than the baffle it is nested within, and the baffles of the set of baffles overlap each other. This nested set of baffles is design to prevent the release of a water surface containing floating oils and greases, and has adequate nested baffle overlap to prevent the release of such oil and grease when the water surface is depressed passing through the baffle system.

In another embodiment the present invention comprises a flow limiting inlet structure comprising a set of one or more baffles adapted to inhibit the flow of surface materials through the baffle set, wherein the inlet area of the baffle set increases as fluid depth increases.

In another embodiment, the present invention comprises a flow limiting inlet structure comprising a discharge riser surrounded by a tiered set of nested baffles. In some such embodiments, each baffle that is nested within another baffle may be positioned at a lower height than the baffle it is nested within, and the baffles of the set of baffles may overlap each other. Such a flow limiting inlet structure comprising a discharge riser surrounded by a tiered set of nested baffles may also have a lower inlet area of a baffle of the set of baffles that is less than the non-overflow inlet area of the discharge riser. In some instances the difference may be great enough that the lower inlet area of a baffle of the set of baffles is less than half or even less than one third of the non-overflow inlet area of the discharge riser.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1A is an illustration of a flow limiting input structure in a detention basin.

FIG. 1B is a side view of the flow limiting input structure of FIG. 1A.

FIG. 1C is a cutaway side view of the flow limiting input structure of FIG. 1A.

FIG. 1D is a bottom view of the baffles and riser of the flow limiting input structure of FIG. 1a.

FIG. 4 is a bottom view of the baffles and riser of an alternative embodiment of the flow limiting input structure of FIG. 1a.

DETAILED DESCRIPTION

Figure 2A:
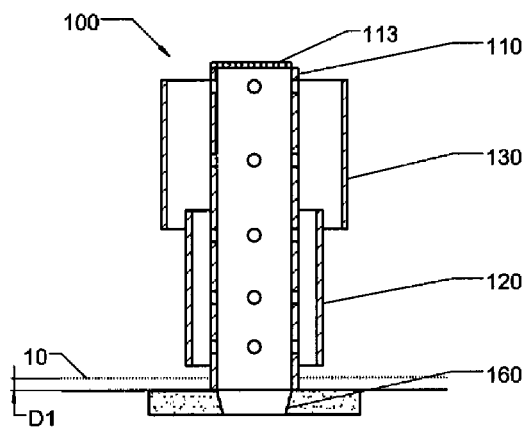
FIG. 2A is a partial cutaway side view of the flow limiting input structure of FIG. 1A illustrating operation of the structure at a first fluid depth.

In FIG. 1A, a flow limiting structure 100 is positioned in a detention basin 20 where basin 20 is partially bounded by basin bottom 21 and by basin perimeter weir 22, and basin 20 includes an outlet 160. Basin 20 contains sediment and surface pollutant containing water 10, and structure 100 controls the flow of water 10 (or any other fluid in basin 20) out of basin 20 through outlet 160. In preferred embodiments, weir 22 is adapted to spill water out of basin 20 when water 10 reaches a height sufficient to overflow structure 100.

As can be seen in FIGS 1A-1D, flow limiting structure 100 comprises a perforated riser 110 having holes 111 and opening 112 covered by hinged grate 113, and a set of two nested and tiered baffles 120 and 130, each baffle (120, 130) comprising lower edges (121, 131) forming lower openings (122, 132), upper edges (123, 133) forming upper openings (124, 134), and a set of support legs (125, 135), separating lower edges (121, 131), from a foundation 150. Baffles 120 and 130 are tiered in the sense that the distance of separation between lower edges 121 and 131 differs between each of the baffles as do the heights of upper edges 123 and 133. Baffle 120 is nested within baffles 130 in that baffle 130 at least partially surrounds baffle 120 and baffle 120 is positioned between baffle 130 and riser 110. Baffle 120, in turn, surrounds riser 110. Baffles 120 and 130 overlap in that upper edge 123 of baffle 120 is higher than lower edge 131 of baffle 130, while lower edge 121 of baffle 120 is lower than lower edge 131 of baffle 130. Structure 100 controls fluid flow into outlet 160 and outlet pipe 170.

Figure 2B:
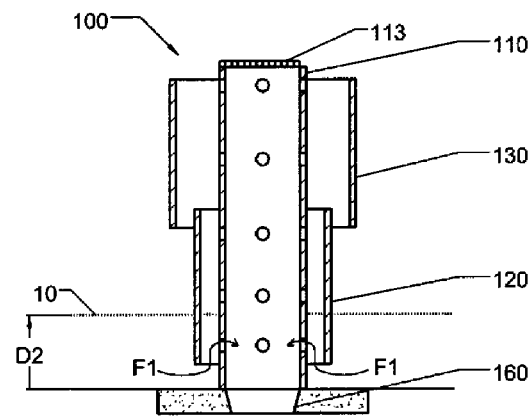
FIG. 2B is a partial cutaway side view of the flow limiting input structure of FIG. 1A illustrating operation of the structure at a second fluid depth.
Figure 2C:
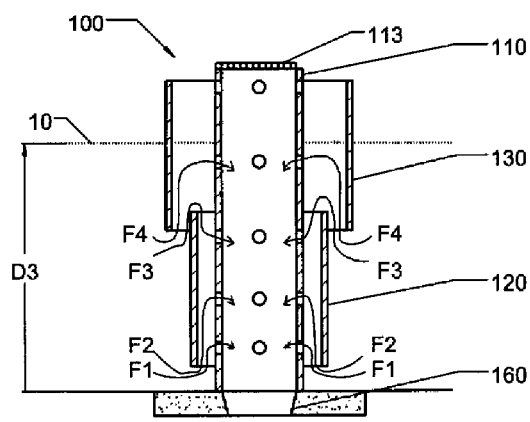
FIG. 2C is a partial cutaway side view of the flow limiting input structure of FIG. 1A illustrating operation of the structure at a third fluid depth.
Figure 2D:
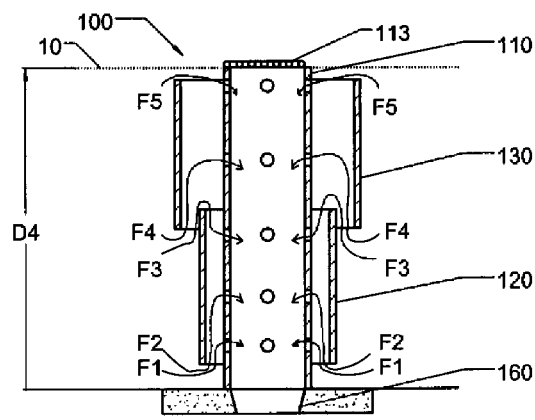
FIG. 2D is a partial cutaway side view of the flow limiting input structure of FIG. 1A illustrating operation of the structure at a fourth fluid depth.

FIGS. 2A-2D illustrate the flow input structure 100 of FIGS 1A-1D as the structure operates to control flow of fluid 10 out of the basin through outlet 160. In FIG. 2A, fluid 10 has a depth D1 at which the surface of fluid 10 is below lower edge 121 of baffle 120 and the lowest set of openings 111 in riser 110. As such, at depth D1 fluid 10 is prevented from flowing through outlet 160 by riser 110. In FIG. 2B, fluid 10 has risen to a level D2 above edge 121 and the lowermost set of openings 111. As such, fluid 10 is able to flow through flow paths F1 under baffle 120, into riser 110, and out outlet 160. In FIG. 2C, fluid 10 has risen to a level D3 above lower edge 130 and above upper edge 123. As such, fluid 10 is able to flow under baffles 120 and 130 and into riser 110 through the four lowermost sets of holes 111 in riser 110 via flow paths F1-F4. In FIG. 2D, fluid 10 has risen to a level D4 above upper edge 131, but just below the upper edge of riser 110 that defines opening 112. As such, fluid 10 is able to flow both over and under baffles 120 and 130 into riser 110 through all the sets of holes 111 in riser 110 via flow paths F1-F5.

It should be noted that flow paths F1-F5 are provided for illustrative purposes only. The actual flow paths through the baffles and riser will likely vary based on a number of factors such as the size, relative spacing, and positions of the holes, risers, and baffles as well as the number and shape of the baffles.

Figure 3A:
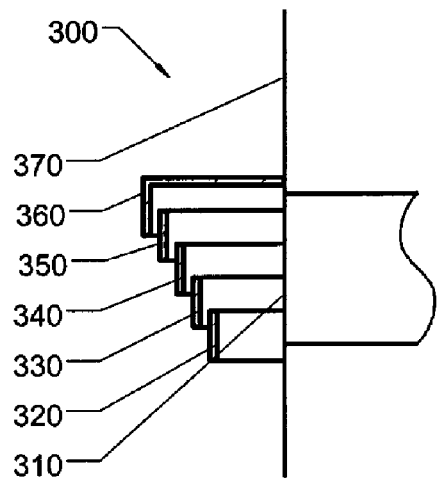
FIG. 3A is a cutaway side view of a second flow limiting input structure.
Figure 3B:
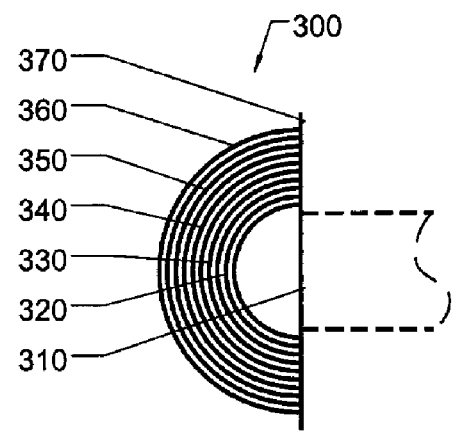
FIG. 3B is a bottom view of the flow limiting structure of FIG. 4A.

Many of the features of structure 110 are equally applicable to side-discharge structures as illustrated in FIGS. 3A and 3B as they are to bottom discharge structures as shown in FIGS. 1A-1D. In FIGS. 3A-3B, a flow limiting input structure 300 is used to control flow of fluids through side outlet 310 where the structure comprises tiered and nested baffles 320, 330, 340, 350, 360, and 370. As shown in FIGS. 3A and 3B, flow limiting input structures as disclosed herein (whether for side or bottom discharge outlets) need not comprise any riser or other flow control device other than the set of nested and tiered baffles. However, although the sizes, positions, and relative spacing of the baffles in a baffle set could be used to control flow rate of fluid into an outlet, it is preferred that a riser or other flow control apparatus be used in conjunction with the baffle set to provide simpler flow rate control, and to provide more options in regard to baffle design. In preferred embodiments, the baffles of a baffle set will be spaced sufficiently far from each other, from the discharge riser, and from the foundation that flow rate through the outlet 160 is substantially, if not totally, determined by any discharge riser or other flow rate control apparatus used in conjunction with the baffle set.

If one compares structure 300 of FIGS. 3A-3B with structure 100 of FIGS. 1A-1D, it is apparent that the number of baffles in the baffle set of structure 300 is greater than the number of baffles in the baffle set of structure 100. The number of baffles will vary between different embodiments, but preferred embodiments will comprise at least two baffles, while more preferred embodiments will comprise three or more baffles. It is contemplated that increasing the number of baffles allows for reduced spacing between baffles and between the innermost baffle and any riser, with a corresponding decrease in surface contaminants that may make it into structures 100 and 300 as being on a surface of fluid 10 inside the perimeter of a baffle as the fluid level rises from below to above the lower edge of the baffle. As such, a design comprising a single baffle sized large enough to allow for maximum flow through the outlet may allow larger amounts of initial leakage of surface contaminants at low fluid levels and is the less preferred than designs that utilize a larger number of baffles.

Figure 4:
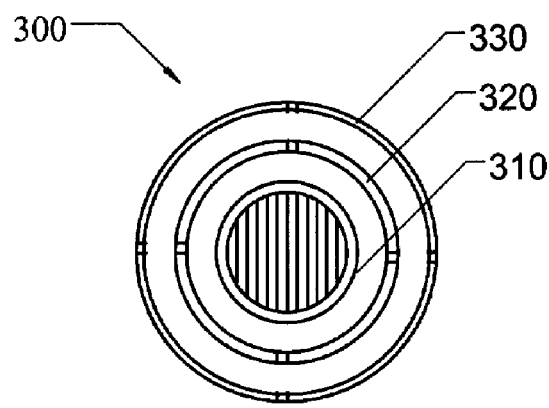
Figure 5:
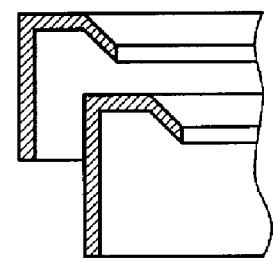
FIG. 5 is a partial cutaway view of an alternative baffle set.

Such a comparison between structure 300 and structure 100 also makes it apparent that the shape of baffles differs between structure 100 and structure 300. When viewed from the top or bottom, the shape of the baffles of a particular embodiment may be square (see FIG. 1D), circular (see FIG. 4), semi-circular (see FIG. 3B), elliptical, or any other shape. Although the embodiments shown have baffle sets wherein every baffle of the set has substantially the same shape as every other baffle, less preferred embodiments may have any combination of similarly or differently shaped baffles within a baffle set. FIGS. 3A and 5 illustrate that baffle shapes may vary in other ways as well. In FIG. 3A, one baffle of the set forms a hood over the other baffles, while in FIG. 5 each baffle forms a partial hood that can help direct flow from higher baffles or from overflow into the structure. Moreover, baffles need not be elongated such that their height exceeds their width as shown in the pictured embodiments. As such, baffles may comprise any shape so long as they function to minimize the amount of surface contaminants that flow through the flow limiting input structure they are a part of.

Figure 6A:
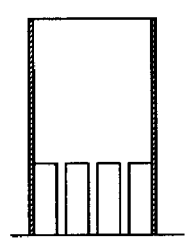
FIG. 6A is a cutaway view of an alternative baffle.
Figure 6B:
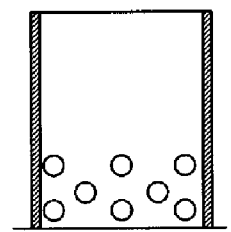
FIG. 6B is a cutaway view of an alternative baffle.

Although the baffles shown in FIGS. 1A-1D comprise support legs (125, 135), other embodiments may utilize different mechanisms for providing baffle support. Any mechanism that supports the baffles while still allowing them to function to prevent flow of a majority of surface contaminants through the inlet structure may be used. As an example, baffles may hang from a bracket or other structure that couples them to a discharge riser, or may all be coupled to one or more baffles that provide support to any other baffles. Another example can be seen in FIG. 3A where the baffles 320-370 may be coupled directly to the side wall that outlet 310 pass through. Yet another option similar to the use of support legs is to use outer baffles that are self supporting but have slots, perforations, or some other feature that permits water to flow through the lower portions of the baffles such as the baffles of FIGS. 6A and 6B.

It is also contemplated that instead of using "short" baffles (i.e. baffles that don't extend to the top of the structure), one or more of the baffles, particularly the innermost baffle (120, 320) may be extended upwards but have the extended portion comprise perforations or slots, or otherwise be adapted to allow fluid to flow through such extended portions. It is contemplated that the use of a partially perforated inner baffles would minimize or eliminate the need for any central discharge riser as the functionality of such a riser would be provided by the upper portions of the interior baffles.

Gaps between baffles and any gap between the innermost baffle and a riser, may include strainers, filter, vanes, or other fluid control mechanisms. It is contemplated that the use of filters in the gaps between baffles may prove advantageous as at least some materials captured in such filters may fall free once fluid levels drop below the height of the filter. It also is contemplated that the use of vanes or other fluid control mechanisms may be advantageously used to improve flow through the flow limiting input structure. Some input structures may be designed to include such screens or filters and also to facilitate the flushing of such screens of filter, possibly without requiring fluid levels to drop below filter heights.

As illustrated by FIGS. 2A-2D, the number of flow paths through the set of baffles (120, 130) increases as the depth of fluid 10 increases. The term "flow path" is used herein to denote any path through which fluid can flow for the current level of fluid. As such, there are no "flow paths" through structure 100 in FIG. 2A as the riser prevents flow of fluid 10 through the structure at a depth/head D1 (measured between the surface and the top of base 150 which defines the top of outlet 160). At a depth D2, structure 100 comprises flow paths F1 under baffle 120 and into the lowermost set of holes 111. At depth D3, structure 100 comprises additional flow paths F2-F4, and at depth D4 also includes flow path F5. The flow paths through the baffle set (120, 130) do not necessarily increase at the same rate as the flow paths through riser 110, or structure 100, as the flow paths through the baffle set depend on the number, size, and relative positions of the baffles in the set. In contrast, the number of flow paths through structure 100 depends on both the number of flow paths through the baffle set and the number of flow paths through riser 110.

In conjunction with the increase in the number of flow paths, the total inlet area of the baffle set (120, 130) and structure 100 increases as the depth of fluid 10 increases. The term "total inlet area" is used herein to denote the sum of the areas of the various openings between the exterior and interior of structure 100 through which fluid can flow for the current level of fluid. In the embodiment shown, this equates to the sum of the areas of the various openings between the interior and exterior of the baffle set (120, 130) for non-overflow levels. At level D1, the total inlet area is zero. At level D2, the total inlet area is equal to the area of opening 122, which is approximately equal to the area defined by lower edge 121 minus the cross sectional area of riser 110. At level D3, the total inlet area is equal to the area of opening 122 plus the area of opening 123. At level D4, the total inlet area is equal to the area of openings 122, plus the area of opening 123, plus the area of opening 134.

Figure 7:
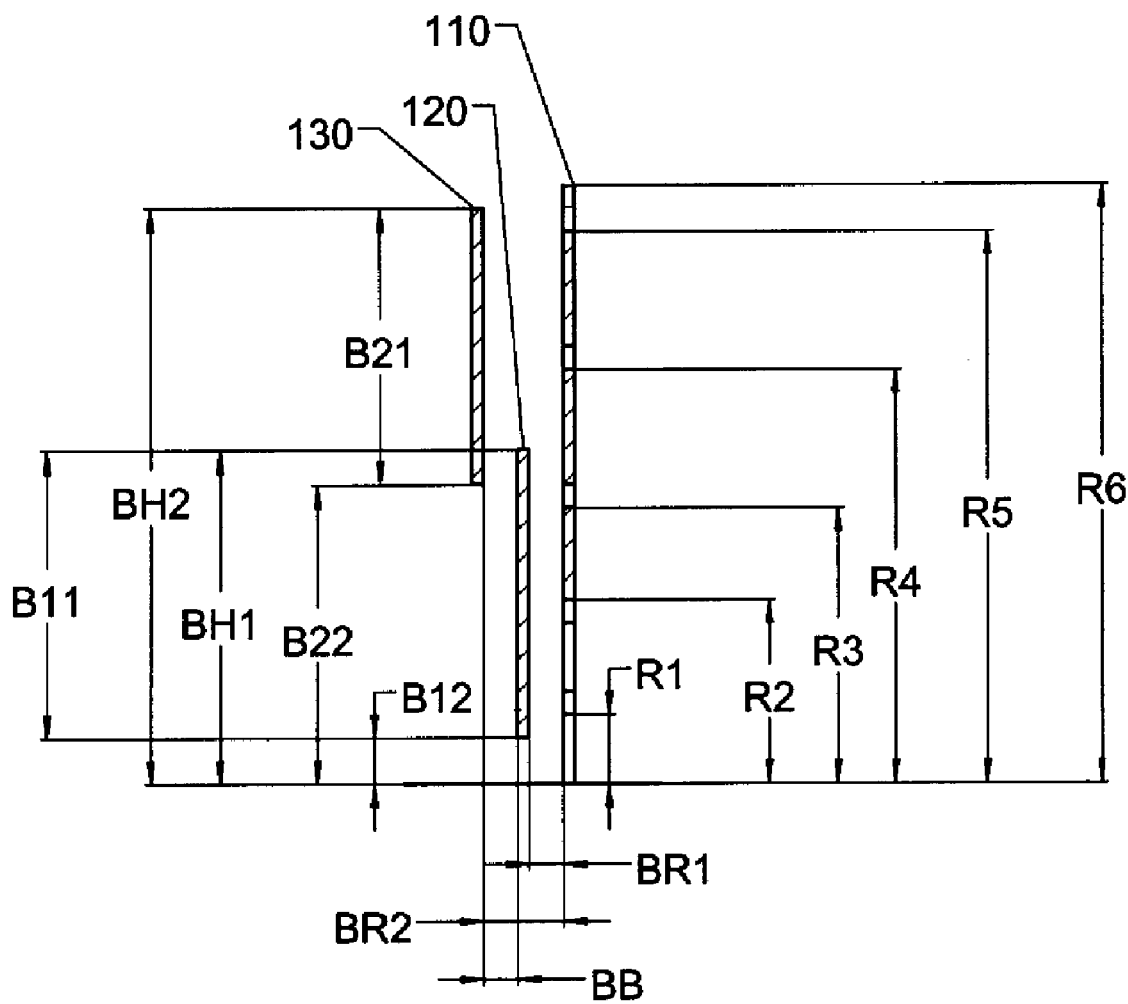
FIG. 7 is a cutaway side view of the input structure of FIG. 1 providing reference numbers for various measurements.

The actual sizes and positions of the baffles will vary between embodiments. However, referring to FIG. 7, in preferred embodiments baffles should overlap (i.e. B22<BH1) and should be nested (BR1<BR2) such that the higher baffles (130, 430-470) are outermost in order to prevent flow of surface contaminants out of the detention basin. Although many embodiments may have baffles of similar dimensions (such as having B11 be approximately equal to B21), it is contemplated that the relative heights of the upper and lower edges of adjacent baffles is much more relevant to proper operation that the sizes of the baffles used. In addition to being higher than the lower edges of outer baffles (BH1>B22), the top edges of inner baffles (120, 420-460) in preferred embodiments will be lower (BH1<BH2) than the top edges of outer baffles (130, 440-470) to provide additional access to the upper portions of any riser. In preferred embodiments, the lower edges of outer baffles will be higher than the lower edges of inner baffles (B22>B12) in order to spread flow paths across the length/height of the inlet structure rather than concentrating them at the bottom. Spreading the flow paths decreases that amount of fluid flowing into the structure near its base and minimizes the amount of sediment pulled into the structure by such bottom flows. Spreading flow paths along the structure also help to prevent the spacing between the bottoms of the baffles and the foundation from becoming a limiting factor on the flow rate of the structure. As sizes and positions may vary, different embodiments may have different values for B11, B12, B21, B22, BH1, BH2, BB, BR1, BR2, and R1-R6.

Riser 110 is preferred to be an elongated, perforated cylinder with a vertical central axis, and may be tall enough to extend higher than the highest baffle surrounding it. However, if it has an overflow inlet that is positioned below the top edge of the outermost baffles, the baffles can still act to prevent flow of surface contaminants into riser 110 and orifice 160 even when fluid levels are sufficiently great as to cause overflow of riser 110.

In less preferred embodiments, riser 110 may not be perforated, may be substantially shorter than the baffles surrounding it, or may be eliminated altogether. In less preferred embodiments, the orifices of riser 110 may be positioned above the highest surrounding baffle if surface filtering of contaminants is less desired at higher fluid levels. Similarly, riser 110 may permit fluid that flows under all the baffles of the baffle set to flow into outlet 160 if surface filtering of contaminants is less desired at lower fluid levels. Although a cylindrical shape is preferred, any riser used may be elliptical, polygonal, irregular or have some other shape. Although holes providing passage from the exterior to the interior of riser 110 are preferred, other embodiments may use slits, rectangular orifices, filtered openings, or some other mechanism to control the flow of fluid from the exterior of riser 110 to its interior. Riser 110 may, in some embodiments, be replaced with some other type of flow control apparatus.

In preferred embodiments the size and positions of the holes (or other inlets) into riser 110 will be sufficient to allow as much fluid to flow into riser 110 as can flow through outlet 160 such that overflow flows through the top of the riser don't increase the throughput of the riser unless fluid is prevented from flowing into one or more of the holes in the riser. Similarly, the baffles of the baffle set at least partially surrounding the riser and/or outlet will be sized and positioned such that the maximum amount of fluid that can be handled by the riser and/or outlet flows through the baffle set without having to overflow the baffle set.

In preferred embodiments the baffles and riser will comprise an open top to handle overflow conditions that may arise from large quantities of fluid accumulating in the detention basin whether from a large storm, clogged inlets in the input structure, or some other reason. However, less preferred embodiments may have riser and/or one or more baffles that are closed on top.

In the embodiment shown, riser 110 comprises a hinged grate 113 that helps prevent objects from flowing into riser 110 during overflow conditions. However, other embodiments may not have any similar type of mechanism, or may use a mechanism other than a hinged grate. In some embodiments, a grate or similar mechanism may be used to filter baffle overflows as well with such grates being used in conjunction with or in place of grate 113.

It is contemplated that the various components of flow limiting inlet structures as disclosed herein may comprise different materials or combinations of materials. The actual choice of materials will likely be determined based on the conditions a structure is expected to have to endure, and the desired life of the structure. In preferred embodiments, flow limiting inlet structures will be constructed of durable and UV resistant materials.

Thus, specific embodiments and applications of storm water control basins and flow limiting inlet structures have been disclosed. It should be apparent, however, to those skilled in the art that many more modifications besides those already described are possible without departing from the inventive concepts herein. As an example, although particularly well adapted for storm water control, the apparatus disclosed herein can be applied equally well to other fluid control applications where settling of sediment and/or filter of surface materials is desired. As an example, fluid accumulating in a detention basin may be the result of a container being drained or a surface being washed rather than a storm. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A storm water detention system comprising a basin sized and positioned to accumulate storm water, and a flow limiting structure impeding flow of water out of the basin through the outlet, the flow limiting inlet structure comprising:
    a set of two or more baffles adapted to hinder floating surface contaminants into the outlet and further wherein said baffles are designed to substantially reduce the release of water surface containing floating oils and greases, and whereby the baffles substantially reduce the release of such oil and grease when the water passes through the baffles;
    a discharge riser having a plurality of openings sized or spaced such that a discharge rate of fluid increases as fluid depth increases;
    wherein each of the baffles has a upper edge and a lower edge;
    the upper edge defines a upper opening spaced from the riser;
    the lower edge defines a lower opening spaced from the riser; and wherein each baffle is coupled to the riser such that water is able to flow over the tipper edge into the riser through the upper opening.

2. The system of claim 1 wherein the set of two or more baffles are a tiered set of nested baffles wherein:
    each baffle that is nested within another baffle is positioned at a lower height that the baffle it is nested within;
    the baffles of the set of baffles overlap each other;
    the difference in height between the upper edge of any baffle that is nested within another baffle and the lower edge of the baffle it is nested within is at least ½ inch; and
    wherein the baffles have relative spacing such that the discharge rate though a outlet is controlled.

* * * * *